Patented Jan. 4, 1938

2,104,240

UNITED STATES PATENT OFFICE 2,104,240

LACQUER-UNDERCOAT PROTECTIVE COATING

William L. Pringle, Chicago, Ill., assignor to United States Gypsum Company, Chicago, Ill., a corporation of Illinois No Drawing. Application July 20, 1931, Serial No. 552,070. Renewed April 7, 1934

16 Claims. (Cl. 91—68)

This invention relates to a protective coating and has reference more particularly to coatings in which a nitro-cellulose lacquer is applied over a suitable undercoat.

Flat wall paint, enamel, calcimine, etc., have been used for wall finishing service for many years. Such finishes have poor washability, are sensitive to alkalis, retain dirt due to their inherent adhesiveness, are sensitive to environment during drying, become sticky in humid weather, retain bacteria, and eventually fail through oxidation, if they have not already been washed off with detergents. It has been proposed to use nitro-cellulose lacquer solutions for wall finishes, owing to the fact that their washability is good, and their stability toward alkali and other chemicals is excellent. However, the adherence of lacquers to plaster walls has been very poor, the pigments used in the lacquer have too often not been limeproof, and the luster of lacquers has varied badly from spot to spot on walls due to uneven capillarity or suction of the base. The nitro-cellulose lacquers cannot be satisfactorily applied to painted surfaces, because they have varnish removing tendencies in their action when so applied and tend to remove the paint. Some difficulty was also experienced in securing a lacquer suitable for wall application which did not have an objectionable odor.

An object of this invention, therefore, is to provide an undercoating material for use on walls of buildings to which can be satisfactorily applied one or more coats of nitro-cellulose lacquer.

Another object of the invention is to provide a system of applying nitro-cellulose lacquers to the walls of a building so that the resulting coat has good washability and resistance to chemicals; also to improve coating materials in other respects hereinafter specified and claimed.

The base coat or primer which I propose to use as an undercoating for the nitro-cellulose lacquer, preferably consists of a cold water paint composition containing casein, a casein solvent and mineral fillers, together with water to make the composition of paint-like consistency.

One of the formulae which I may use with satisfaction as an undercoating for the nitro-cellulose lacquer is as follows:—

| | Percent |
|---|---|
| Casein | 6 |
| Metronite | 59.7 |
| Titanium pigment | 20 |
| Zinc oxide | 3 |
| Irish moss | 0.1 |
| Tribromophenol | 0.2 |
| Borax | 2 |
| Hydrated lime | 9 |
| Total | 100 |

To this composition, enough water is added to bring to paint-like consistency, usually about 6–8 gallons of water per 100 pounds of dry mixture. After the water is thoroughly mixed with the paint, linseed oil may be thoroughly mixed into the wet paint in the proportion of 3–7 quarts of oil to 100 pounds of the dry paint. Instead of linseed oil, other drying oils may be used, as well as certain varnishes, or turpentines and turpentine substitutes. The main function of the oil is to form an emulsion with the rest of the paint ingredients and also to improve the resistance to washing and the wearing qualities of the resulting paint film. The oils also make the paint still more elastic and the wet paint more easily applied with a brush. This oil may be omitted and still give satisfactory results.

In the above formula, the lime and the borax both act as solvents for the casein. The casein acts as a binder for the paint and imparts hardness, durability and water resistance. The casein also serves as an emulsifying agent if oils are added to the paint. The casein is preferably coated with mineral oil or other repellent substances which slow up the rate of solution and lessen lumping. It should not be so fine as to cause lumping, nor should it contain coarse particles which will go into solution too slowly. The preferred screen analysis of the casein is as follows:

| | Percent |
|---|---|
| All through 40 mesh | |
| Through 40 on 100 mesh | 30 to 45 |
| Through 100 | 55 to 70 |

The casein content may be varied from 5% to over 30%.

The mineral fillers mentioned in the above preferred formula may be replaced in whole or in part by a variety of other inert fillers, such as calcium, magnesium or barium carbonates, by silicates such as kaolin, talcs or mica, by silica, by barium sulphate or calcium sulphate in their various forms, or by other fillers of similar material, or by mixtures of any of these. These inorganic constituents may be varied from practically all fillers with low refractive indices, such as whiting or Portland cement, to practically all pigments with high refractive indices, such as lithopone and titanium pigments. These mineral fillers may be varied from 0 to 70%. The titanium pigment referred to in the preferred formula usually is sold as an intimate mixture of about 25% titanium dioxide and 75% of barium sulphate. This titanium pigment is usually prepared by precipitating titanium dioxide on barium sulphate, adds greatly to the opacity of the undercoat, and increases the ability to hide or obscure the surface to which it is applied.

The zinc oxide is a pigment which adds to the whiteness and hiding qualities of the paint. This ingredient has one unique property in that it combines to a certain extent with the casein to form a gel. This gel improves the brushing qualities and also the resistance to moisture of the dry paint film. The zinc oxide may be varied between 1% and 5%. The Irish moss, or Chondrus, prevents settling of the mixed paint. It may be replaced by pectin, agar-agar or similar gelling agents. The amount may be increased, decreased or this ingredient may be entirely eliminated.

The hydrated lime may be from either high calcium or dolomitic limes. A white product is to be preferred. The lime acts both as a solvent for the casein, and also as an insolubilizer. A high calcium lime is preferred as there is less danger of its aging in the package. The proportion of the lime may vary from 4% to 12%. The borax also acts as a solvent for the casein and aids in preventing lumps when the casein goes into solution. Its most important function is the prevention of mold growth. I have discovered that in a casein paint containing lime, the borax greatly retards the growth of molds, and any mold which does grow, is white or very light pink or orange so that they are not noticeable, but mold growth is usually entirely prevented.

The naturally resistant properties of the water paint as disclosed by the above formula are greatly enchanced by the application of the nitrocellulose lacquer thereto. Where spray gun application of the nitro-cellulose lacquer is to be employed, the following lacquer formula will be found suitable:

| | Parts |
|---|---|
| Nitrocellulose | 60 |
| Dibutyl phthalate | 27 |
| Glycerol ester gum | 57 |
| Toluol | 187 |
| Light petroleum naphtha | 50 |
| Butyl alcohol | 26 |
| Ethyl alcohol | 100 |
| Butyl acetate | 42 |
| Ethyl acetate | 40 |
| And pigment if desired | |

Where brush application is to be used where the odor of the lacquer is not objectionable:

| | Parts |
|---|---|
| Nitrocellulose | 60 |
| Dibutyl phthalate | 27 |
| Glycerol ester gum | 57 |
| Toluol | 82 |
| Xylol | 105 |
| Heavy petroleum naphtha | 50 |
| Butyl alcohol | 75 |
| Ethyl alcohol | 50 |
| Amyl acetate | 40 |
| Butyl acetate | 42 |
| And pigment if desired | |

Where brush application is to be used where minimum of odor is required:

| | Parts |
|---|---|
| Nitrocellulose | 40 |
| Ethyl alcohol | 15 |
| Dibutyl phthalate | 18 |
| Castor oil | 10 |
| Glycerol ester gum | 36 |
| Butyl lactate | 120 |
| Heavy petroleum naphtha | 171 |
| And pigment if desired | |

The kind and amount of pigment which should be used in connection with the lacquer, is, of course, open to a wide choice. It is preferable to use pigments which are insensitive to hydroxyl ions in preference to those which tend to react with the other ingredients in the lacquer. As preferred pigments, I recommend the use of oxides of zinc, titanium and antimony, yellows such as potassium sulphides, reds such as mercury sulphides or cadmium selenide, greens such as chromium oxide, and blues such as ultramarine blue or cobalt oxide.

My improved coating material may be successfully used over bad plastered walls, plasterboard, fiberboards, ply-wood, cement, concrete, brick, etc. It is not recommended for exterior use subjected to weather conditions. All surfaces should be dry, clean and free from dirt, grease, scale, loose plaster and efflorescence. Cracks should be filled with patching plaster or plaster of Paris. Nail holes and joints in wallboard should be filled or jointed over in a satisfactory manner. New lime or gypsum plaster jobs should not be finished until they are perfectly dry. Lime plaster should be permitted to stand unfinished for one or two months. Magnesium silico fluoride is recommended for treating areas where efflorescence has been encountered. Any old calcimine finish on a wall should be cleaned with water and a sponge before application of my undercoating material, care being taken to remove all traces of it, especially in cracks and corners around doors and window frames. Wallpaper should be steamed, soaked or scraped off clean before applying the undercoating material. After stripping off the wallpaper, the walls should be washed with 15% solution of sal soda in hot water to get off the last traces of paste and glue size.

Painted surfaces, such as flat wall paint, gloss oil, varnish or enamel, should be brushed free of dust, dirt, soot, etc. Grease, polish, wax, etc., should be washed off with high test gasoline. If the cleaned surfaces show any luster or glossiness, they should be washed with strong detergents, such as washing powder, and the detergent should be completely rinsed off the wall before applying the undercoating material. If the nitrocellulose lacquer is to be applied as the second coat over another coating of lacquer, or over an old coating of lacquer in good condition, no undercoating material will be necessary.

The undercoating material should be mixed with water in a clean tin or galvanized iron pail. For larger quantities, a wooden bucket or barrel may be used provided it is clean. The temperature of water used should never be below 60°. The dry paint material is sifted with constant stirring into the water and allowed to stand 30 minutes before use. At the end of this time it is thoroughly stirred and sufficient clean water is mixed in to bring it to the desired consistency. The undercoating material should be strained through a wire screen or piece of cheesecloth prior to use. After the dry paint material is mixed with water, it is gradually injured by prolonged exposure to the air, and during winter, it should not be used after it has become three or four days old, while in summer a new batch should be mixed every 24 hours. The undercoating paint may be applied by a large brush. For brush application on porous surfaces, such as unpainted lime putty or wallboard, it is advisable to size the surface with a shellac or varnish size prior to application of the undercoating paint. The undercoating paint may be applied by any air atomizing spray gun adaptable to cold water paint. Brushes, spray guns, pails and mixing tubs should be washed clean every night. The nitro-cellulose lacquer is applied over the undercoating paint much the same as an ordinary paint with a good brush which is clean and free of old paint, or paint solvent such as turpentine or naphtha. If the lacquer is to be applied by a spray gun, the pressure tank should be agitated to keep the pigments in suspension. The undercoating paint when partially dry may be stippled by means of a regular painter's stipple brush. Early English effects are produced by cross-brushing when partly dry or with a wide scraping knife or spatula. Mission finish is secured by working over the partly set undercoating paint with a small brush and giving it a circular twist. One pound of the dry undercoating paint will be found to cover about 25 to 50 square feet of surface, while one gallon of the lacquer will cover 200 to 300 square feet.

The combination of the nitro-cellulose lacquer with the casein paint undercoating produces a wall finish which is washable over a long period of time, which presents a surface that is immune to the attack of grime and dirt in a great many ways, is proof against the staining of ink, juices or blood in hospital rooms, or similar locations, and which can be put on with a much less consumption of time. The undercoat paint will dry in about two hours and the nitro-cellulose lacquer finishing coat will require about the same length of time to dry thoroughly. Owing to the peculiar bonding effect of the casein paint for the lacquer, the latter will not peel, crumble or flake off. The combination finish is capable of meeting the requirements of high speed finishes and gives combination results not heretofore known to the art.

I would state in conclusion that while the illustrated examples constitute a practical embodiment of my invention, I do not wish to limit myself precisely to these details, since manifestly, the same may be considerably varied without departing from the spirit of the invention as defined in the appended claims.

Having thus described my invention, I claim as new and desire to secure by Letters Patent:—

1. The method of coating a building surface, which comprises applying to said surface a water paint containing casein 5-30%, mineral fillers 0-70%, pigment, hydrated lime 4-12%, a preservative and water, permitting said paint to dry, and applying a nitrocellulose lacquer to said paint surface.

2. The method of coating a building surface, which comprises applying to said surface a casein water paint containing pigments and fillers, allowing said paint to dry, and applying to said paint surface a nitro-cellulose lacquer containing nitrocellulose, dibutyl phthalate, glycerol ester gum, and suitable organic solvents.

3. The method of coating a building surface, which comprises applying to said surface a water paint containing casein, mineral filler, pigment, tribromophenol, borax, hydrated lime and water, allowing said paint to dry, and applying to said dried paint surface a lacquer containing pigment, nitrocellulose, dibutyl phthalate, glycerol ester gum, ethyl alcohol and other suitable organic solvents.

4. The method of coating a building surface which comprises applying to said surface a water paint comprising approximately the following composition:—

|  | Per cent |
|---|---|
| Casein | 6. |
| Mineral filler | 59.7 |
| Pigment | 23. |
| Tribromophenol | 0.2 |
| Borax | 2. |
| Hydrated lime | 9. |
| Water to working consistency |  | allowing said paint to dry and applying to said dried paint surface a lacquer comprising approximately the following composition:

|  | Parts by weight |
|---|---|
| Nitrocellulose | 60 |
| Dibutyl phthalate | 27 |
| Glycerol ester gum | 57 |
| Ethyl alcohol | 100 |
| Other organic solvents about 345 parts |  |
| Pigment to produce the desired color |  |

5. The method of coating a building surface of plaster or dried oil paint, which comprises applying to said surface a water paint containing 5-30% casein, pigments and 0-70% fillers, allowing said paint to dry, and applying to said paint surface a nitrocellulose lacquer containing dibutyl phthalate, glycerol ester gum and suitable organic solvents.

6. A building surface coating comprising an undercoat of casein paint containing mineral fillers and pigments, and a finishing coat comprising nitrocellulose modified with dibutyl phthalate and glycerol ester gum.

7. The method of coating a building surface which comprises first applying to the said surface a water paint comprising from 5% to 30% of casein, a solvent for said casein, water, and up to 85% of mineral filler and pigment, and thereupon applying a cellulose ester lacquer to the surface produced by said water paint.

8. The method of coating a building surface which comprises first applying to the said surface a water paint comprising 5 to 30% of casein, a solvent for said casein, water, and up to 85% of mineral filler and pigment, and thereupon applying a cellulose nitrate lacquer to the surface produced by said water paint.

9. A finishing system comprising a building surface having adhering thereto, in the order named:—(1) A dried water paint which comprises not less than 5% of casein, a solvent for the casein, and up to 85% of mineral filler and pigment; and (2) a dried cellulose ester lacquer.

10. A finishing system comprising a building surface having adhering thereto, in the order named:—(1) A dried water paint which comprises not less than 5% of casein, a solvent for the casein, and up to 85% of mineral filler and pigment; and (2) a dried cellulose nitrate lacquer.

11. A finishing system comprising a building surface having adhering thereto, in the order named:—(1) A dried water paint containing 5 to 30% of casein, a solvent for the casein, pigments and fillers up to 70%; and (2) a dried cellulose nitrate lacquer containing dibutyl phthalate and glycerol ester gum.

12. A finishing system comprising a building surface having adhering thereto, in the order named:—(1) A dried water paint containing 5 to 30% of casein, up to 70% of mineral fillers, 4 to 12% of hydrated lime and a preservative; and (2) a dried layer of a nitrocellulose lacquer.

13. A finishing system comprising a building surface having adhering thereto, in the order named:— (1) A dried casein water paint containing pigments and fillers; and (2) a dried layer of cellulose nitrate lacquer, which latter contains dibutyl phthalate and glycerol ester gum which has been dissolved in organic solvents.

14. A method for finishing bare plaster surfaces which comprises applying an undercoat comprising casein paint which contains at least 15% of casein, and subsequently applying to said undercoating at least one coat of brushing lacquer, the major liquid constituents of said brushing lacquer comprising butyl lactate and petroleum hydrocarbons.

15. A finishing system comprising a bare plaster or like base having adhering thereto at least one coat of a casein-containing undercoating, the last coat of said undercoating containing at least 15% casein, and said undercoating having adhering thereto at least one coat of a nitrocellulose brushing lacquer.

16. A finishing system comprising a bare plaster base having adhering thereto an undercoat comprising casein paint which contains at least 15% of casein, and said undercoating having adhering thereto at least one coat of a nitrocellulose brushing lacquer.

WILLIAM L. PRINGLE.